United States Patent [19]

Taylor

[11] 4,261,089

[45] Apr. 14, 1981

[54] PNEUMATICALLY POWERED ELASTIC RING EXPANDER

[75] Inventor: Geoffrey J. W. Taylor, Blenheim, New Zealand

[73] Assignee: Elastrator Company Limited, Blenheim, New Zealand

[21] Appl. No.: 18,176

[22] Filed: Mar. 7, 1979

[51] Int. Cl.[3] .............................................. B23P 19/02

[52] U.S. Cl. ...................................................... 29/235

[58] Field of Search ...................... 29/235; 128/303 A

[56] References Cited

U.S. PATENT DOCUMENTS

| | | | |
|---|---|---|---|
| 2,561,286 | 7/1951 | Montgomery | 29/235 |
| 2,582,640 | 1/1952 | Maddox | 29/235 |

*Primary Examiner*—James L. Jones, Jr.

*Attorney, Agent, or Firm*—Birch, Stewart, Kolasch & Birch

[57] ABSTRACT

The invention relates to a pneumatically powered tool for expanding elastic rings. The expander includes four prongs which in use are passed through a ring and forced apart by a pneumatic ram to stretch the ring into a square by a reverse cam action of a pneumatic ram thereby opening two jaws which each carry one prong. The second pair of prongs are carried by two arms each linked to a jaw so as to open and close with the jaws. The arms are also directly coupled to the ram so that when it acts to open the jaws it also slides the arms longitudinally along the jaws so that the arm prongs are forced longitudinally apart from the corresponding jaw prongs.

When a double acting pneumatic ram is used a tool mounted two-section two-way rocker valve directs compressed air to the appropriate side of the ram piston and allows air to be exhausted from the opposite side.

10 Claims, 4 Drawing Figures

PNEUMATICALLY POWERED ELASTIC RING EXPANDER

BACKGROUND OF THE INVENTION

This invention relates to elastic ring expanders and in particular power operated ring expanders.

In the meat works industry it is necessary at some stage after slaughtering to cut out, remove and seal off the anus of the slaughtered animal to prevent soiling of the dressed carcass. It has been proposed to carry out this sealing process with the use of a rubber constricting ring, which in the contracted state will have a diameter small enough to seal effectively. It is necessary to expand the ring to a diameter many times the natural diameter before application and this requires an expansion force beyond the capabilities of known manual ring expander tools. It is therefore desirable to produce a ring expander of heavy construction including power means to supply the necessary expanding force. Such a ring expander would also have application in the packaging industry where rubber rings are used for sealing.

SUMMARY OF THE INVENTION

It is an object of the present invention to provide an elastic ring expander which goes some way towards meeting the abovementioned desideratum.

The invention consists in an elastic ring expander which include the following components: a hand held body, a pneumatically actuated ram the cylinder of which is integral with the expander body, and two jaw shaped members pivoted from one end of the body. In addition, rollers are associated with the ram piston which operatively contact the jaw members such that upon extension of the ram the jaw members open, a first ring engaging means is dependent from the jaw members. Further, two arms are coupled to the ram piston and each is constrained to move laterally with a corresponding jaw member, a second ring engaging means is dependent from the arms. Finally, a control valve is integral with the body portion which controls the flow of air to and from the ram cylinder, and an air hose connection is provided which communicates with said valve, and a valve actuator mounted on the body. The construction and arrangement is such that when the piston is retracted the ring engaging means are contiguous but when said ram is expanded the first and second ring engaging means move apart laterally and the second ring engaging means move longitudinally apart from the first ring engaging means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The ring expander of the present invention utilizes a principle known for manual instruments where four ring engagement means or prongs are located in touching contact and with parallel axes to enable a rubber ring to be placed around the outside of the prong surfaces whereupon all four prongs are made to separate from each other to form the corners of an approximate square with the expanded ring forming the sides of the square.

Figure 1:
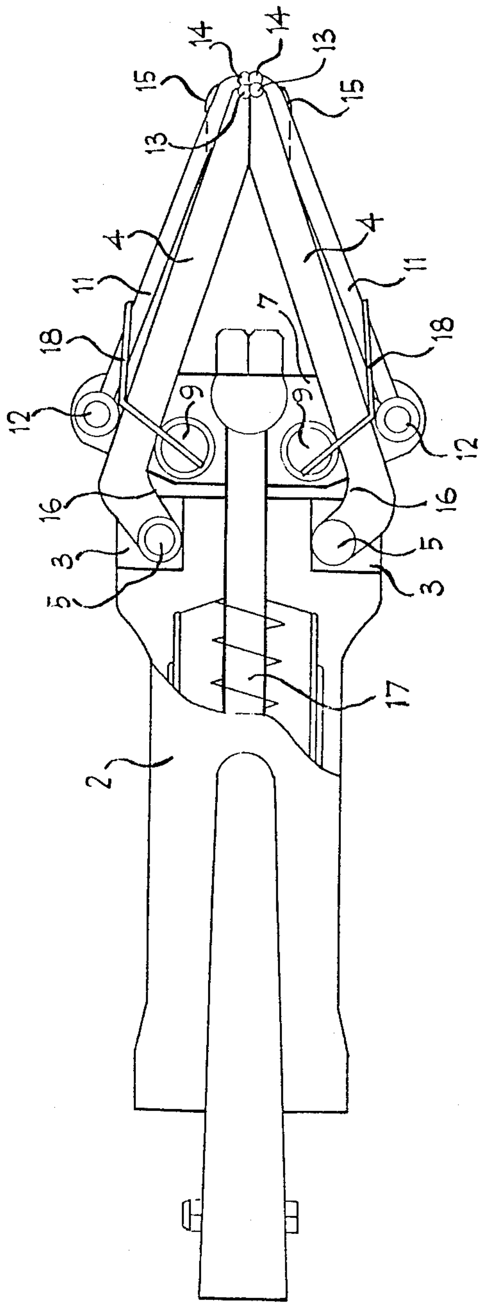
FIG. 1 is a plan view and partial longitudinal-section of one form of power operated elastic ring expander.

In both embodiments to be described the ring expander is constructed around a pneumatic ram cylinder 2 (see FIG. 1) which is externally shaped to form a convenient handle to be gripped by the operator, and comprises the body portion of the expander.

The forward end of the cylinder is shaped to provide diametrically opposite retaining slots 3 within which the inner ends of jaw members 4 are pivotally coupled by the use of pins 5. The jaw members 4 are shaped so that their inner surfaces curve outwardly for a short distance from the pivot point before returning inwardly for a considerably longer length. First ring engagement means or prongs 13 are mounted at the outer extremities of the jaw members and at right angles thereto. The outer end of piston rod 17 carries a ram head 7 upon which are mounted two nylon rollers 9 which engage with the inside surfaces of the jaw members 4. When the piston rod 17 is fully retracted the rollers 9 are adjacent to the sharply curved portion 16 of the jaw members. In this position the jaw members 4 are closed and ring engaging means 13 are in touching contact. When power is applied to the piston 1, causing the piston rod to extend, rollers 9 move along the inside surfaces of the jaw members and by a cam action cause the jaw members to open and thus the ring engagement means 13 to move apart laterally.

The ram head 7 also carries two arms 11 pivoted from the ram head at 12. These arms pass between guide lugs 15 on the outer ends of the jaw members 4. Springs 18 hold the arms within the guide lugs. Accordingly, arms 11 can only slide in a longitudinal direction with respect to the jaw members. Further, any lateral movement in the jaw members 4 will result in a corresponding lateral movement of arms 11. When the piston rod is in the retracted position and the jaw members are closed, the second ring engagement means 14 carried at the outer ends of arms 11 are in contact with each other and in contact with the first ring engagement means 13. As the piston rod 17 extends, moving jaw members 4 apart, arms 11 slide longitudinally through guide lugs 15 to result in ring engagement means 14 being increasingly spaced from ring engagement means 13. It will be understood then that as the piston rod extends jaw members 4 apart laterally arms 11 move outwardly longitudinally as well as moving laterally apart with the jaw members. Accordingly, the ring engagement means 13 and 14 are caused to move apart to form the corners of an approximate square.

Figure 2:
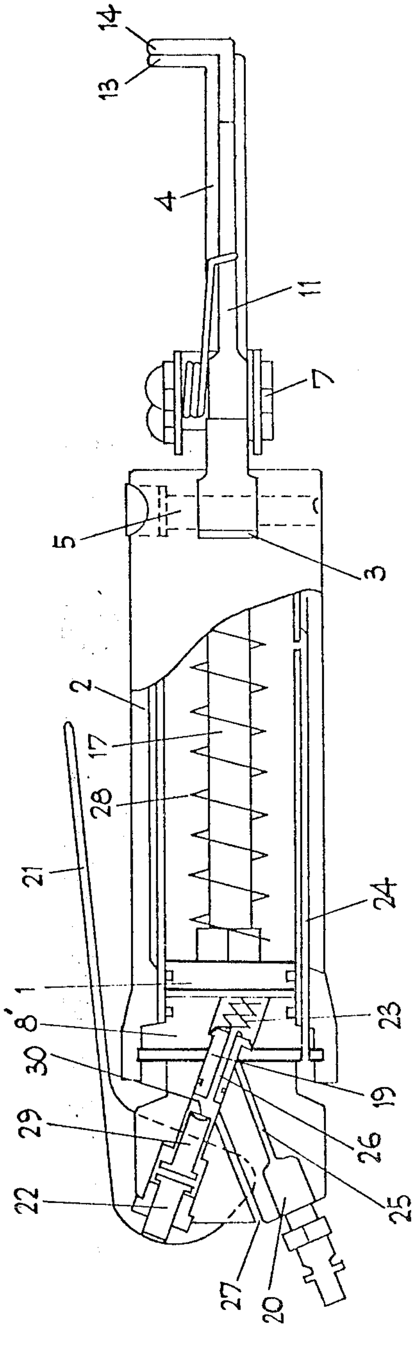
FIG. 2 is a side elevation and partial longitudinal-section of the ring expander of FIG. 1.

In the first form of expander (FIG. 2), an end plug 8′ seals cylinder 2 and contains an air valve 19 and an air hose coupling point 20. The valve is operated by an actuator 21 which is pivotally mounted to the end plug and extended along the body of the expander. The actuator when depressed strikes valve plunger 22 which, through plunger 29, moves the valve 19 inwards against valve spring 23 to allow main line air to enter the cylinder through bore 25 and act against piston 1 and move ram head 7 forward in the manner already described. A second valve plunger 29 carries a seal 30 so that when the valve 19 is open to admit main line air, an axial passageway 26 through valve 19 is sealed. The low-pressure side of the cylinder breathes to atmosphere through port 24. Upon release of the actuator 21 the valve 19 returns to its former position to seal off the bore 25 and to allow the pressurized air to escape from the cylinder through the passageway 26 in valve 19 and bore 27 in the end plug 8. A compression spring 28 causes the piston to retract as the cylinder loses pressure.

Figure 3:
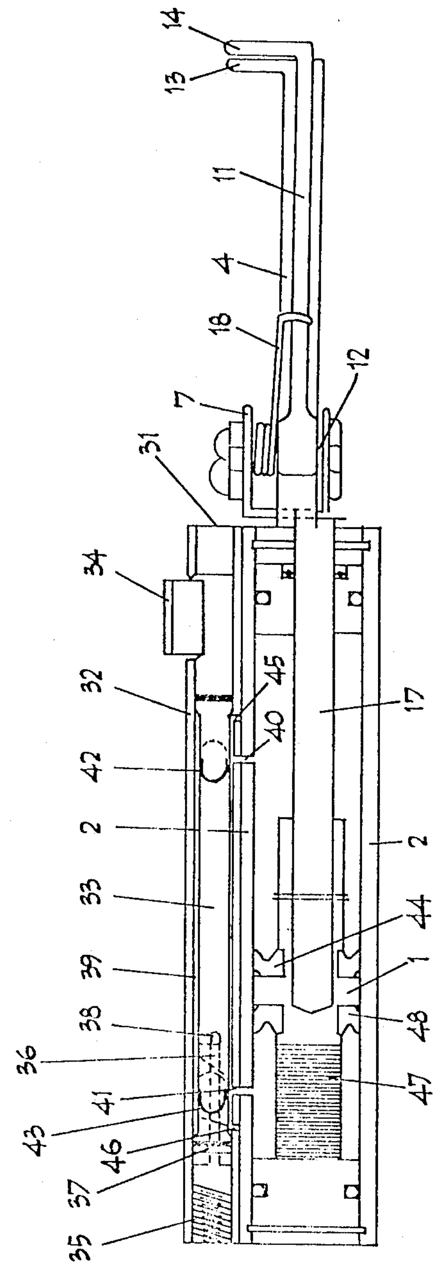
FIG. 3 is a longitudinal section of a second form of powered ring expander.
Figure 4:
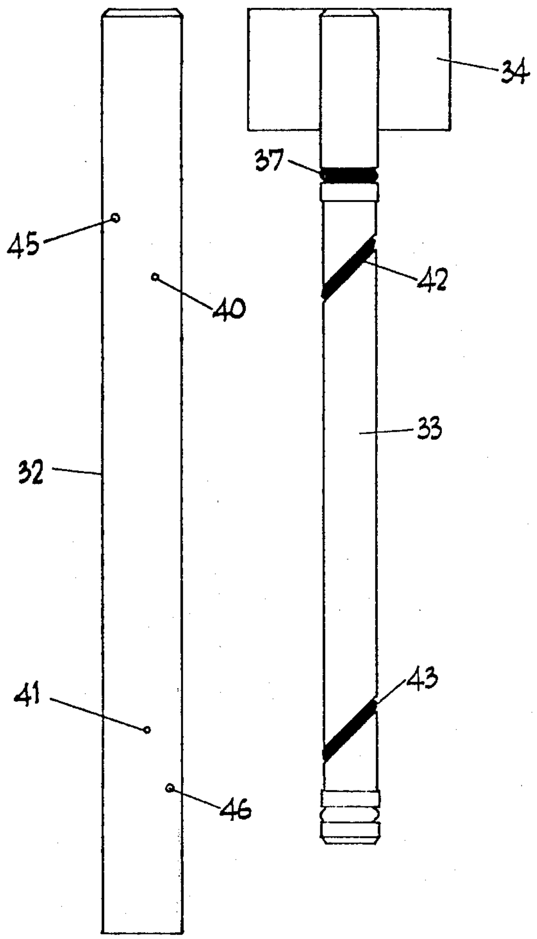
FIG. 4 shows the control valve of the second form of ring expander in diagrammatic form.

In the second form of expander a double acting piston 1 is used and as a consequence the control valve arrangement is different. In this case a control valve assembly 31 (see FIG. 3) is mounted lengthwise along the outside of the cylinder 2. The valve assembly 31 comprises a tube 32 within which there is located a valve 33 (shown in more detail in FIG. 4) having a cylindrically shaped body, which is free to rotate but not to move longitudinally. The valve 33 rotates through a working arc of about 70° by means of the rocker lever 34 which is thumb operated. An air hose connector is provided at the rear end of the tube 32 and from there compressed air is admitted into a bore 36 in the valve 33. Air is prevented from flowing between tube 32 and the valve by an O-ring 37. A radial orifice 38 provides a passageway from the end of bore 36 to the reduced diameter periphery of the valve 33, thus permitting air to pass into the annular cavity 39 between the tube and valve. Communicating with this cavity are ports 40 and 41 which permit air to pass into the main cylinder forward and rearwards of the piston 1 respectively.

Whether air passes through port 40 or port 41 is dependent upon the angular position of respective eliptical valve sealing rings 42 and 43 respectively. These sealing rings are in face O-rings placed in a groove encircling the periphery of the valve, the groove being inclined with respect to the longitudinal axis of the valve. When the valve is rotated to one extreme by the rocker lever 34 the valve seal 43 engages with tube 32 rearward of the port 41 and thus allows air to enter this port, whereas the valve seal 42 engages with the tube rearward of the port 40 and thus prevents air from reaching port 40 from cavity 39. Accordingly a charge of air is introduced into cylinder 2 rearwards of the piston 1 and the piston is driven to expand the ring engaging means 13 and 14. Air forward of the piston seal 44 is exhausted from cylinder 2 through orifice 45 and passes longitudinally along a channel cut in the body of the valve cylinder 32 where it is vented at the rear of the expander. When the valve is rotated to the opposite extreme of its angular travel, sealing ring 43 crosses forward of the inlet port 41 while sealing ring 42 opens the port 40 to cavity 39 thereby introducing a charge of compressed air forward of piston 1 to cause it to retract and the air rearwards of piston seal 48 is exhausted through orifice 46 to be vented at the rear of the expander. A compression spring 47 is provided between the piston and the cylinder end block to reduce the retraction force of the piston so as to prevent possible injury to an operator in the event of some part of his body being caught within the ring expanding gear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An elastic ring expander comprising:
   - a hand held body,
   - a pneumatically actuated piston, the cylinder of which is integral with said body said piston including a ram head,
   - two jaw shaped members pivoted from one end of said body,
   - rollers associated with the ram head which operatively contact the jaw members such that upon extension of the piston the jaw members open,
   - first ring engaging means dependent from the jaw members,
   - two arms coupled to said ram head and each constrained to move laterally with a corresponding jaw member,
   - second ring engaging means dependent from said arms,
   - a control valve integral with said body portion which controls the flow of air to and from the piston cylinder,
   - an air hose connection which communicates with said valve,
   - and a valve actuator mounted on said body, the construction and arrangement being such that when the piston is retracted the ring engaging means are contiguous but when said piston is expanded the first and second ring engaging means moves apart laterally and the second ring engaging means move longitudinally apart from the first ring engaging means.

2. An elastic ring expander according to claim 1 wherein said piston is double-acting and said valve is a two-section device mounted on the outside of the piston cylinder and communicating therewith, one valve section controlling the flow of air into and out of the cylinder rearward of the piston and the other flow forward of the piston, the valve sections being switched by angular rotation and rotated by a common shaft operated by a rocker lever.

3. An elastic ring expander according to claim 2 wherein said valve comprises a tube mounted on the exterior of the piston cylinder and parallel with the longitudinal axis thereof, said tube including two sets of longitudinally spaced apart inlet and exhaust ports which communicate with opposite ends of the piston cylinder, a shaft located within said tube and free to rotate therein, said shaft provided with sealing means at each end, an air passageway in said shaft which leads air entering the valve to the annular cavity bounded by said sealing means and the inner and outer surfaces of tube and shaft respectively, elliptical sealing means encircling opposite ends of said shaft which each co-operate with an inlet and exhaust port pair so that when the shaft is fully rotated in one direction a first inlet port communicates with said cavity and a second exhaust port is open to ambient, whereas when the shaft is fully rotated in the opposite direction a second inlet port communicates with said cavity and a first exhaust port is open to ambient.

4. An elastic ring expander according to claim 1, wherein said two jaw shaped members include a curved portion positioned adjacent to said body, in the piston retracted position said rollers being disposed adjacent to said curved portion and in the piston expanded position said rollers engage an inside surface to open said jaw shaped members through a camming action.

5. An elastic ring expander according to claim 1, wherein said two arms being spring biased to normally hold said arms adjacent to said jaw shaped members.

6. An elastic ring expander according to claim 5, and further including guide lugs operatively mounted adjacent an outer end of said jaw shaped members to limit movement of said arms to slide in a longitudinal direction with respect to said jaw shaped members.

7. An elastic ring expander according to claim 1, wherein expansion of said piston laterally displaces said jaw shaped members and longitudinally and laterally displaces said arms to position said first and second ring engaging means at the corners of an approximate square.

8. An elastic ring expander according to claim 2, wherein when said valve is in the closed position, pressurized air acting on said piston is vented to the atmosphere and a spring is operatively disposed to retract said piston.

9. An elastic ring expander according to claim 3, wherein said valve rotates through a working arc of approximately 70°.

10. An elastic ring expander according to claim 3, wherein a spring is operatively disposed relative to said piston to limit the retraction force of said piston.

* * * * *